(12) United States Patent
Graells et al.

(10) Patent No.: US 9,273,970 B2
(45) Date of Patent: Mar. 1, 2016

(54) SYSTEMS AND METHODS FOR GENERATING A PLURALITY OF TRIP PATTERNS

(71) Applicant: Google Inc., Mountain View, CA (US)

(72) Inventors: Albert Graells, Zurich (CH); Lucien Pech, Zurich (CH)

(73) Assignee: Google Inc., Mountain View, CA (US)

( * ) Notice: Subject to any disclaimer, the term of this patent is extended or adjusted under 35 U.S.C. 154(b) by 106 days.

(21) Appl. No.: 13/894,025

(22) Filed: May 14, 2013

(65) Prior Publication Data

US 2015/0168149 A1 Jun. 18, 2015

(51) Int. Cl.
 *G01C 21/00* (2006.01)
 *G01C 21/26* (2006.01)
 G01C 22/02 (2006.01)
 G08G 1/0968 (2006.01)
 G01C 21/34 (2006.01)
 G01C 22/00 (2006.01)

(52) U.S. Cl.
 CPC ............... *G01C 21/26* (2013.01); *G01C 21/00* (2013.01); *G01C 21/34* (2013.01); *G01C 22/002* (2013.01); *G01C 22/02* (2013.01); *G08G 1/096844* (2013.01)

(58) Field of Classification Search
 CPC ........ G01C 21/26; G01C 22/02; G01C 21/34; G01C 22/002; G08G 1/096844
 USPC ......... 701/400, 413, 416, 420, 527–533, 540; 340/531, 539.1, 539.11, 988, 990, 994, 340/995.1, 995.19; 713/190; 370/238
 See application file for complete search history.

(56) References Cited

U.S. PATENT DOCUMENTS

| | | | |
|---|---|---|---|
| 5,845,227 A * | 12/1998 | Peterson | 701/420 |
| 7,595,740 B2 | 9/2009 | Pechenick et al. | |
| 8,249,810 B2 | 8/2012 | Jones | |
| 8,271,190 B2 * | 9/2012 | Smartt | 701/409 |
| 8,417,409 B2 * | 4/2013 | Bast | G01C 21/3423 701/25 |

(Continued)

OTHER PUBLICATIONS

Bast et al., "Fast Routing in Very Large Public Transportation Networks using Transfer Patterns", Proceedings of the 18th Annual European Conference on Algorithms; Part I, Liverpool, United Kingdom, Sep. 6-8, 2010, pp. 290-301.
Delling et al., "Computing and Evaluating Multimodal Journeys", Kartsruhe Reports in Informatics 2012, Oct. 20, 2012—19 pages.
Delling et al., "Round-Based Public Transit Routing", Proceedings of the 14th Meeting on Algorithm Engineering and Experiments, Kyoto, Japan, Jan. 16, 2012, pp. 130-140.

(Continued)

*Primary Examiner* — Muhammad Shafi
*Assistant Examiner* — Majdi Alsomiri
(74) *Attorney, Agent, or Firm* — Dority & Manning, P.A.

(57) ABSTRACT

Systems and methods for generating a plurality of trip patterns are provided. One exemplary method includes receiving transit graph data describing a plurality of nodes respectively corresponding to a plurality of transit stations and a plurality of arcs respectively connecting the plurality of nodes. The method also includes performing a plurality of identification iterations. Each identification iteration includes determining an optimal transit trip connecting an origin node to a destination node based on a cost model. Each identification iteration also includes revising the cost model based on the determined optimal transit trip, such that the arc costs associated with one or more arcs associated with the optimal transit trip are increased. Each optimal transit trip can have an associated trip pattern describing a sequence of nodes traversed by such optimal transit trip. One exemplary system can include a transit planning platform that includes a trip pattern identification module.

19 Claims, 6 Drawing Sheets

(56) References Cited

U.S. PATENT DOCUMENTS

| | | | |
|---|---|---|---|
| 8,700,328 B1* | 4/2014 | Raychev et al. | 701/533 |
| 2009/0040931 A1* | 2/2009 | Bast et al. | 370/238 |
| 2011/0022304 A1 | 1/2011 | Lee | |
| 2011/0112759 A1* | 5/2011 | Bast | G01C 21/3423 701/533 |
| 2012/0232776 A1 | 9/2012 | Gontmakher et al. | |

OTHER PUBLICATIONS

Muller-Hannemann et al., "Finding All Attractive Train Connections by Multi-Criteria Pareto Search", Algorithmic Methods for Railway Optimization: International Dagstuhl Workshop, Railway Optimization 2004, Dagstuhl Castle, Germany, Jun. 20-25, 2004, pp. 246-263.

* cited by examiner

SYSTEMS AND METHODS FOR GENERATING A PLURALITY OF TRIP PATTERNS

FIELD

The present disclosure relates generally to transit system trip planning. More particularly, the present disclosure relates to systems and methods for generating a plurality of potential trip patterns with respect to one or more transit systems.

BACKGROUND

Many services exist for planning a route using a transit system. Typically, a user inputs a departure and/or arrival time as well as origin and destination locations to the transit planning service. Search algorithms are used to identify possible transit trips between the origin and the destination across one or more modes of transportation, such as ferries, buses, rails, walking, etc.

Certain services can return only a single result based on a complex model and a computationally expensive search algorithm. Other services can attempt to identify a large number of trips to consider for recommendation, but may use computationally expensive methods, fail to provide a large diversity of results, or identify too few trips worthy of consideration.

SUMMARY

Aspects and advantages of the invention will be set forth in part in the following description, or may be obvious from the description, or may be learned through practice of the invention.

One exemplary aspect of the present disclosure is directed to a computer-implemented method of determining a plurality of trip patterns. The method includes receiving transit graph data describing a plurality of nodes respectively corresponding to a plurality of transit stations and a plurality of arcs respectively connecting the plurality of nodes and respectively corresponding to transportation between the plurality of transit stations. The method also includes performing a plurality of identification iterations. Each identification iteration includes determining an optimal transit trip connecting an origin node to a destination node based on a cost model. The cost model provides an arc cost for each of the plurality of arcs. Each identification iteration also includes revising the cost model based on the determined optimal transit trip, such that the arc costs associated with one or more arcs associated with the optimal transit trip are increased. Each subsequent identification iteration can determine the optimal transit trip based on the cost model as revised by the immediately preceding identification iteration such that a plurality of optimal transit trips are determined. Each optimal transit trip can have an associated trip pattern describing a sequence of nodes traversed by such optimal transit trip.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
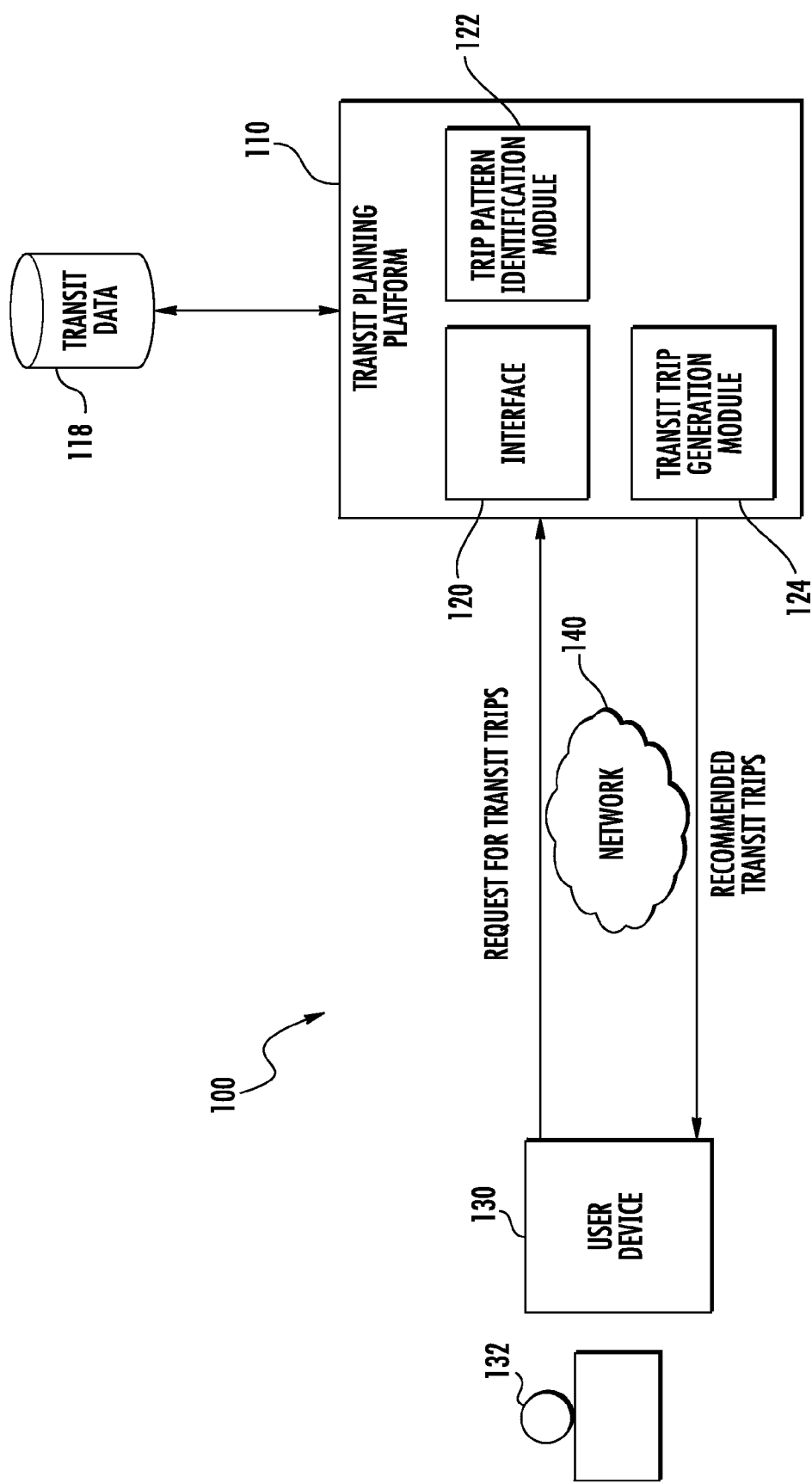
FIG. 1 depicts an overview of an exemplary system for transit trip planning according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a method for determining a plurality of trip patterns. Each trip pattern can describe a sequence of stations at which a traveler travelling on a transit trip connecting an origin station to a destination station boards or alights a vehicle providing transportation, such as particular instances of transportation by bus lines, rail lines, etc. First, a transit graph comprising a plurality of arcs (available instances of transportation) and nodes (arrival or departure of an instance of transportation at a transit station) can be searched to find a first optimal transit trip from the origin to the destination according to a given cost model. The sequence of stations at which a traveler is required to board or alight a vehicle providing transportation according to the first optimal transit trip can be described by a first trip pattern. The cost model can be revised to penalize one or more arcs associated with the first optimal transit trip and the transit graph can be searched again to find a second optimal transit trip based on the revised cost model. By iteratively performing such method, a plurality of transit trips can be determined and, likewise, a plurality of trip patterns can be identified. Next, additional trip patterns can be identified by merging trip patterns found using the iterative method. In particular, a second graph can be constructed based on selected of the determined transit trips or trip patterns. Additional arcs that were not identified by the iterative searching process can be added to the second graph. Additional unique trip patterns included within the second graph can be determined using one or more graph traversal algorithms. All discovered trip patterns can be stored and a plurality of transit trips can be identified based on the plurality of trip patterns.

A transit graph can be provided that comprises a plurality of nodes and arcs. Each arc can correspond to an available instance of transportation using a transit line. For example, an exemplary arc may correspond to transportation using Bus Line 3 from Station X to Station Y from 9:00 AM to 10:00 AM on a Monday. Each node of the transit graph can respectively correspond to arrival or departure of an instance of transportation at a transit station. Therefore, the exemplary arc corresponding to an instance of transportation using Bus Line 3 would connect at least two nodes: the departure of Bus Line 3 from Station X at 9:00 AM and the arrival of Bus Line 3 at Station Y at 10:00 AM. In some implementations, walking arcs or driving arcs, such as arcs representing transportation by taxi cab or rental vehicle, can be included in the transit graph.

A cost model can be used to define an arc cost associated with each arc. In particular, such cost model can incorporate a plurality of parameters reflective of various costs associated with each arc, including duration, fare, mode of transportation, transit provider (agency), or a penalty associated with undesirable factors such as a walking penalty. Thus, the arc cost for each arc can be the sum of its costs for each parameter.

A first optimal transit trip connecting an origin station to a destination station can be determined based on the transit graph. In particular, the first optimal transit trip should minimize trip cost according to the cost model. Any suitable shortest path algorithm can be used to find such first optimal transit trip, including Dijkstra's algorithm. A first trip pattern can describe a sequence of nodes at which a traveler travelling upon the first optimal transit trip boards or disembarks from a vehicle providing transportation. Such first trip pattern can be extracted or otherwise identified and stored.

After the first search, one or more of the arcs connecting transit stations associated with nodes traversed by the first optimal transit trip can be penalized (e.g. have their costs increased) and the transit graph can be searched again to find a second optimal transit trip. Due to the penalization of the one or more arcs, this second optimal transit trip likely traverses one or more different stations or sequence of stations than the first optimal transit trip. Thus, repeating the above process can provide a plurality of unique trip patterns.

In one embodiment, all arcs connecting transit stations associated with a pair of sequential nodes included in the first trip pattern can be penalized. For example, if the first optimal transit trip has the following trip pattern: A>B>B>C>C>D, then all arcs connecting the transit stations respectively associated with nodes A and B, all arcs connecting the transit stations respectively associated with nodes B and C, and all arcs connecting the transit stations respectively associated with nodes C and D can be penalized.

Further, the added penalties for each arc can be proportional to a duration associated with such arc. Therefore, arcs that have a greater duration can receive a larger penalty. In such fashion, the resulting plurality of trip patterns can include trip patterns with more significant diversity.

In another embodiment, all arcs connecting the pair of transit stations respectively associated with the pair of nodes connected by the solution arc that contributes the greatest cost to the first optimal transit trip are penalized. For example, if solution arc (B, C) contributes the greatest cost out of solution arcs (A, B), (B, C), and (C, D), then all arcs connecting the transit stations respectively associated with nodes B and C can be penalized. As another example, a similar penalization can be applied based upon which solution arc has the associated duration of greatest magnitude.

In yet another embodiment, each transit line utilized by the first optimal transit trip can be penalized. For example, if arc (B, C) comprises a portion of a "Bus Line 1" and arc (C, D) comprises a portion of a "Metro Line 2," then all arcs that correspond to either Bus Line 1 or Metro Line 2 can be penalized following the first search. Further embodiments can add penalties based on mode of transportation or vehicle provider (agency).

Once the transit graph has been modified with the added penalties, then the shortest path algorithm is performed again in order to determine a second optimal transit trip. Due to the added penalties, the second optimal transit trip is likely different from the first optimal transit trip.

Therefore, iteratively repeating the above process can provide a plurality of unique trip patterns. For example, the above method can be performed for a fixed number of iterations or can be stopped when the determined transit trips or associated trip patterns become repetitive or fail to meet certain criteria.

However, in some implementations, iteratively repeating the above process can fail to identify every available trip pattern. For example, certain arcs can fail to be identified when revising the cost model includes penalizing all arcs corresponding to the entire optimal transit trip.

Therefore, according to another aspect of the present disclosure, the trip patterns identified by the iterative process discussed above can be merged together in order to identify additional trip patterns. In particular, a second graph can be built from selected of the plurality of optimal transit trips determined by the above iterative process or their associated trip patterns. For example, the trip patterns resulting from the first ten iterations of the above method can be selected and a directed graph can be formed from arcs connecting the stations described by such trip patterns.

One or more additional arcs can be added to the second graph. For example, walking arcs or other suitable arcs connecting nearby stations can be added to the second graph.

Finally, the additional trip patterns can be identified by performing one or more graph traversal algorithms with respect to the second graph. All discovered trip patterns can be stored and a plurality of transit trips can be identified based on the plurality of trip patterns.

With reference now to the FIGS., exemplary embodiments of the present disclosure will now be discussed in detail. FIG. 1 depicts an overview of an exemplary system 100 for transit trip planning according to an exemplary embodiment of the present disclosure. The system 100 can include a transit planning platform 110 in communication with a computing device 130 over a network 140. The transit planning platform 110 can be hosted by any suitable computing device, such as a web server. The computing device 130 can be any suitable computing device, such as a laptop, desktop, smartphone, tablet, mobile device, wearable computing device, or other computing device.

A user 132 can input a request for one or more transit trips from an origin to a destination into the computing device 130 using a suitable user interface, such as a browser or other interface, including an interface embedded into a geographic information system. The computing device 130 can send the request for transit information to the transit planning platform 110. The request can be for a recommendation of specific transit trips between an origin and destination. The transit trips can be associated with one or more different transit routes and can use one or more modes of transportation, such as rails, ferries, buses, etc.

As used herein, a transit route is a fixed set of transit paths between an origin and a destination and can include multiple modes of transportation. An example transit route can be a combination of one or more portions of transit lines, such as bus lines, rail lines, walking paths, etc. that allow an individual to reach the destination. A transit trip is a specific instance of transportation over the transit route and is associated with a particular departure time and a particular arrival time. A plurality of transit trips can be associated with each transit route and can have different departure and arrival times.

A transit trip exhibits a trip pattern. In particular, the sequence of stations at which a traveler travelling upon such transit trip boards or alights a vehicle providing transportation can be described by a trip pattern. As such, the trip pattern for each transit trip can describe, in order, each instance in which a traveler travelling upon such transit route would board, get on, get off, disembark, or alight vehicles, transit lines, or modes of transportation. Transit trips and trip patterns will be discussed further with respect to FIG. 3.

Returning to FIG. 1, the request for transit trips can be a departure time based request or an arrival time based request. A departure time based request seeks transit trips between an origin and a destination that depart later than a specified time $T_D$. Usually, transit trips are optimized for arrival time in recommending transit trips responsive to the departure time based request. An arrival time based request seeks transit trips between an origin and a destination that arrive earlier than a specified time $T_A$. Transit trips are typically optimized for departure time in recommending transit trips responsive to the arrival time based request. The transit planning platform 110 can receive the request from the computing device 130. For example, the transit planning platform 110 can include a suitable interface 120 for connecting to the network 140 and receiving the request.

The transit planning platform 110 can access transit data 118. Transit data 118 can include information associated with one or more transit systems, such as transit schedules, departure times, arrival times, stops, fares, walking distance, transfers, and other information associated with the one or more transit systems. Transit data 118 can be stored in one or more internal or external databases or other suitable storage means or can be accessed via network 140.

The transit planning platform 110 can implement a trip pattern identification module 122 to identify a plurality of trip patterns respectively associated with a plurality of transit trips between an origin and a destination. Each trip pattern can describe a sequence of stations or stops at which a passenger upon a transit trip either boards or disembarks a vehicle providing transportation. According to aspects of the present disclosure, trip pattern identification module 122 can implement an iterative method in order to identify the plurality of trip patterns. For example, trip pattern identification module 122 can iterate between determining an optimal transit trip based on a cost model and revising the cost model based on the determined optimal transit trip.

As another example, trip pattern identification module 122 can build an additional transit graph and perform one or more graph traversal algorithms with respect to such additional transit graph. In such fashion, any previously identified trip patterns can be merged to identify additional trip patterns.

The transit planning platform 110 can also implement a transit trip generation module 124 to generate a set of transit trips. In particular, transit trip generation module 124 can generate or identify one or more transit trips for each of the plurality of trip patterns identified by trip pattern identification module 122. In some instances, transit trip generation module 124 can be viewed as "adding time" to the trip patterns determined by trip pattern identification module 122.

The transit planning platform 110 can send one or more transit trips to the user device 130, for instance, over the network 140. The user device 130 can then display the one or more time transit trips to the user 132 through a suitable user interface. In particular, in some implementations, user device 130 can provide the recommended transit trips in conjunction with a geographic information system or device location identification system in order to provide user 132 with continuing navigational instructions.

Figure 2:
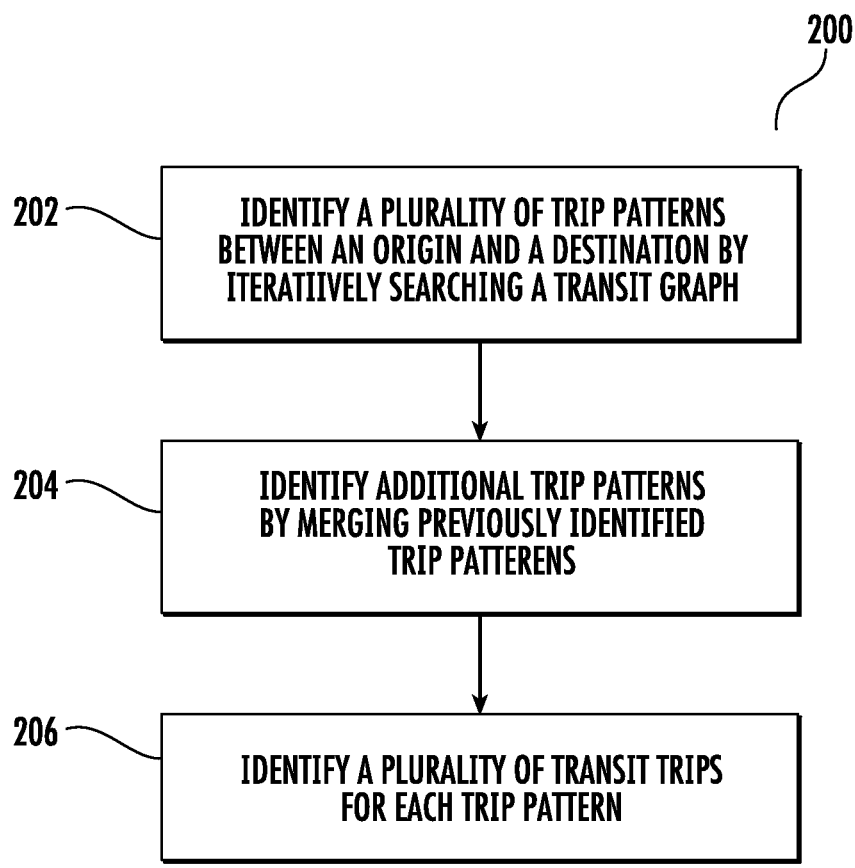
FIG. 2 depicts a flowchart of an exemplary method for identifying a plurality of trip patterns and transit trips according to an exemplary embodiment of the present disclosure.

FIG. 2 depicts a flow diagram of an exemplary method (200) for identifying a plurality of trip patterns and transit trips according to an exemplary embodiment of the present disclosure. While exemplary method (200) will be discussed with reference to the system 100 of FIG. 1, method (200) can be implemented using any suitable computing system. In addition, although FIG. 2 depicts steps performed in a particular order for purposes of illustration and discussion, methods of the present disclosure are not limited to such particular order or arrangement. One skilled in the art, using the disclosures provided herein, will appreciate that various steps of the method (200) can be omitted, rearranged, combined, and/or adapted in various ways without deviating from the scope of the present disclosure.

At (202) a plurality of trip patterns between an origin and a destination can be identified by iteratively searching a transit graph. As an example, transit panning platform 110 can implement trip pattern identification module 122 to identify a plurality of trip patterns.

In particular, according to aspects of the present disclosure, a plurality of identification iterations can be performed at (202) to respectively identify the plurality of trip patterns. Each identification iteration can determine an optimal transit trip from an origin to a destination based upon application of a cost model to transit graph data. Further, each identification iteration can revise such cost model based on the determined optimal transit trip. Therefore, each subsequent identification iteration can determine its optimal transit trip based on the cost model as revised by the previous identification iteration. In such fashion, a plurality of unique optimal transit trips are determined.

At (204) additional trip patterns can be identified by merging the plurality of trip patterns previously identified at (202). In particular, a second transit graph can be built at (204) based on such previously identified trip patterns. The additional trip patterns can be identified by performing one or more graph traversal algorithms with respect to the second transit graph. All identified trip patterns can be stored for further processing.

At (206) a plurality of transit trips can be identified for each time-independent trip pattern. As an example, transit planning platform 110 can implement transit trip generation module 124 to generate the plurality of transit trips based on the plurality trip patterns identified at (202) and (204). In some instances, (206) can be viewed as "adding time" to the plurality of trip patterns.

Figure 3:
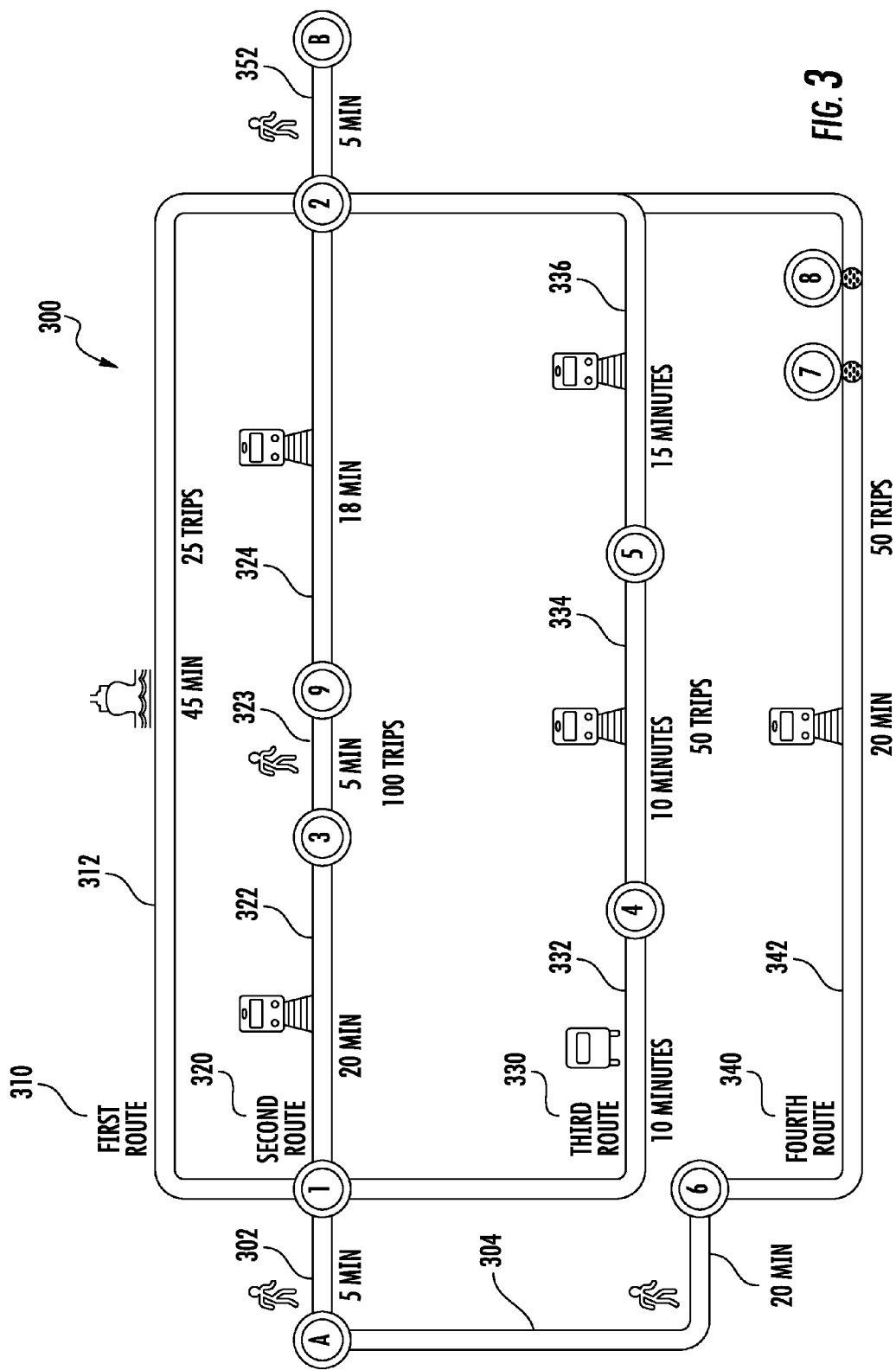
FIG. 3 depicts a representation of an exemplary transit system according to an exemplary embodiment of the present disclosure.

FIG. 3 depicts a representation of an exemplary transit system 300 that includes a plurality of identified transit routes 310, 320, 330, and 340 between an origin A and destination B. Each of the transit routes 310, 320, 330, and 340 can include a plurality of transit paths respectively providing transportation between a plurality of transit stations.

As used herein, a transit path is any available path of transportation from one location to another, such as portions of bus lines, tram lines, train lines, metro lines, taxi driving paths, user driving paths, walking paths, subway lines, or other suitable means of transportation from one location to another.

Further, as used herein, a transit station can be any location at which a traveler can get on, get off, join, alight, disembark, or transfer transit paths. For example, a transit station can include a bus stop, a ferry terminal, a subway station, a metro station, a tram stop, terminal, airport, rail station, designated taxi-hailing location, or other suitable transit station.

In some implementations, walking paths and driving paths can be considered as time-independent elements of a transit system. Therefore, transit stations are not limited to locations at which traditional public transportation is accessible, but can include any location at which a walking path may begin, such as, for example, the particular location at which a user submits a request for transit trip planning.

As an example, transit route 310 involves walking from Origin A to Station 1 along a walking path 302, boarding a ferry line 312 at Station 1, disembarking ferry line 312 at Station 2, and walking from Station 2 to the Destination B along a walking path 352. Therefore, transit trips along transit route 310 exhibit the following trip pattern: 1>2.

Transit route 320 involves walking from Origin A to Station 1 along walking path 302, boarding a rail line 322 at Station 1, disembarking rail line 322 at Station 3, walking from Station 3 to Station 9 along walking path 323, boarding a tram line 324 at Station 9, disembarking tram line 324 at Station 2, and walking to Destination B along walking path 352. Therefore, transit trips along transit route 320 exhibit the following trip pattern: 1>3>9>2.

Transit route 330 involves walking from Origin A to Station 1 along walking path 302, boarding a bus line 332 at Station 1, disembarking bus line 332 at Station 4, boarding a tram line 334 at Station 4, disembarking tram line 334 at Station 5, boarding a tram line 336 at Station 5, disembarking tram line 336 at Station 2, and walking from Station 2 to the Destination B along walking path 352. Therefore, transit trips along transit route 330 exhibit the following trip pattern: 1>4>4>5>5>2.

Transit route 340 involves walking from Origin A to Station 6 along walking path 304, boarding rail line 342 at Station 6, disembarking rail line 342 at Station 2, and walking from Station 2 to Destination B along walking path 352. Therefore, transit trips along transit route 340 exhibit the following trip pattern: 6>2.

One of skill in the art will appreciate that exemplary transit system 300 has been simplified for the purposes of illustration and explanation of the present disclosure. As an example, each transit path can pass through, pause at, or otherwise visit one or more transit stations in addition to those shown in FIG. 3.

For example, rail line 342 is shown as passing through or pausing at Stations 7 and 8 en route from Station 6 to Station 2. Therefore, transit route 340 traverses Stations 7 and 8. Such information concerning all stations traversed by a given transit path can be processed, stored, and intelligently considered by a system implementing the present disclosure. However, because a passenger travelling upon transit route 340 from Origin A to Destination B does not transfer vehicles, lines, or modes of transportation at Stations 7 or 8, Stations 7 and 8 are not included in the trip pattern exhibited by transit trips along transit route 340.

One of skill in the art will further appreciate, in light of the disclosures contained herein, that transit paths can be discretized into a number of sub-paths. For example, rail line 342 can be viewed as a single transit path connecting Station 6 to Station 2. Alternatively, rail line 342 can be viewed as three discrete transit paths which cumulatively connect Station 6 to Station 2. In particular, three transit paths respectively connecting Station 6 to Station 7, Station 7 to Station 8, and Station 8 to Station 2 can collectively connect Station 6 to Station 2.

The present disclosure can be implemented to consider transit paths according to any suitable level of discretization. In particular, as will be discussed further, transit graph data including a plurality of arcs respectively corresponding to transportation between transit stations can be modeled such that multiple arcs can be treated as a single arc when corresponding to transit paths that collectively connect two transit stations.

A transit trip is a specific instance of transportation over a transit route and is associated with a particular departure time and a particular arrival time. As an example, a transit trip over transit route 310 can include a specific instance of use of ferry line 312. For example, a transit trip over transit route 310 could include, at a particular day or instance within a reoccurring period, walking from Origin A to Station 1 from 9:00 AM to 10:05 AM, riding ferry line 312 from Station 1 to Station 2 from 10:05 AM to 10:50 AM, and walking from Station 2 to Destination B from 10:50 AM to 10:55 AM.

Therefore, for each time-independent transit route, there can be a specific number of transit trips during a specified time interval. As an example, if ferry line 312 provides transportation from Station 1 to Station 2 five times per day Monday through Friday, then 25 distinct transit trips over transit route 310 exist in a standard week. As another example, transit routes 320, 330, and 340 can respectively have 100, 50, and 50 transit trips in the same period of time.

Each transit trip can have a specific departure time and a specific arrival time. The departure time and the arrival time can be estimated time(s) or can be times determined or identified from data associated with the transit network, such as transit time tables.

Figure 4A:
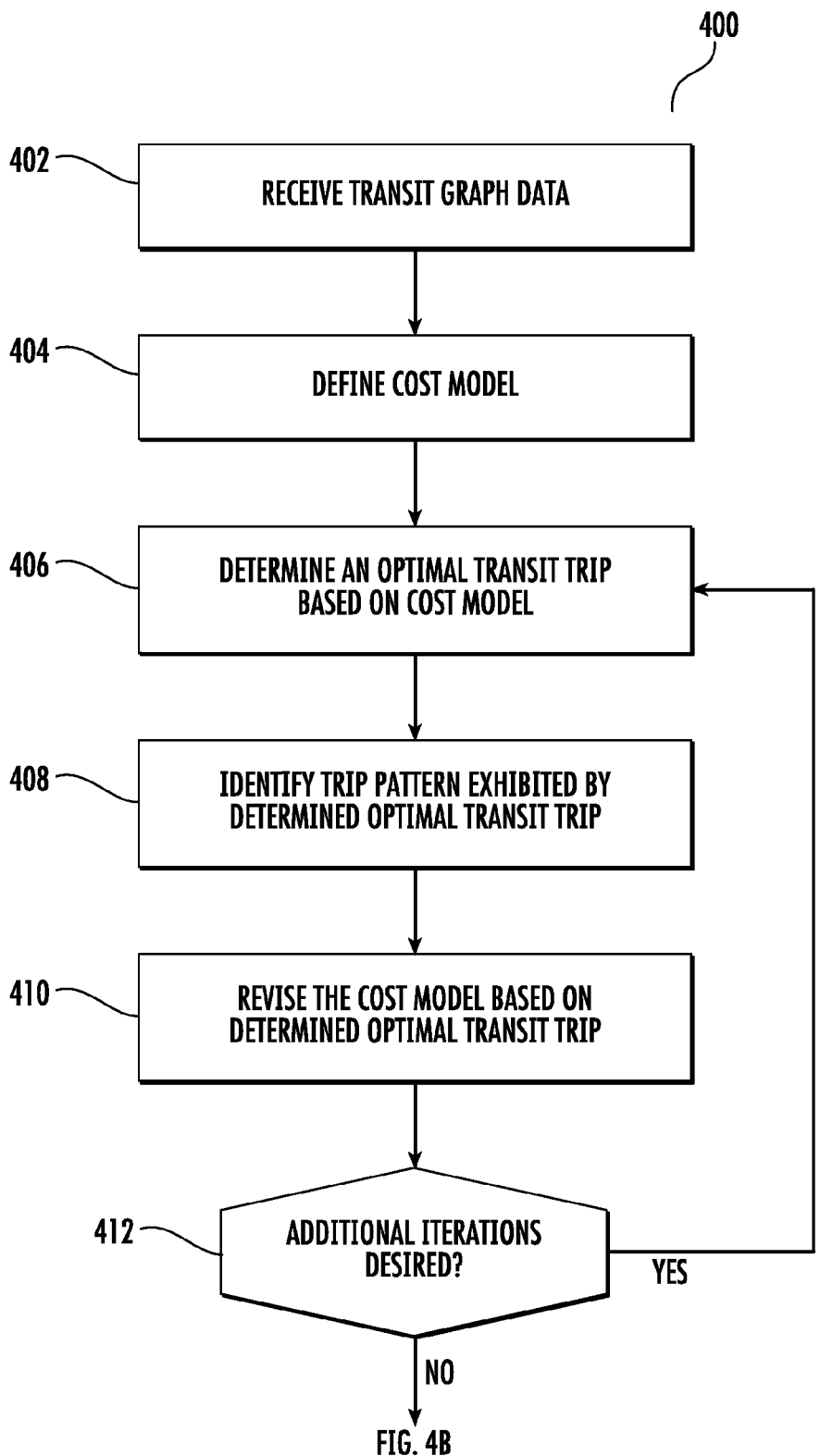
FIGS. 4A and 4B depict a flowchart of an exemplary method for determining a plurality of trip patterns according to an exemplary embodiment of the present disclosure.
Figure 4B:
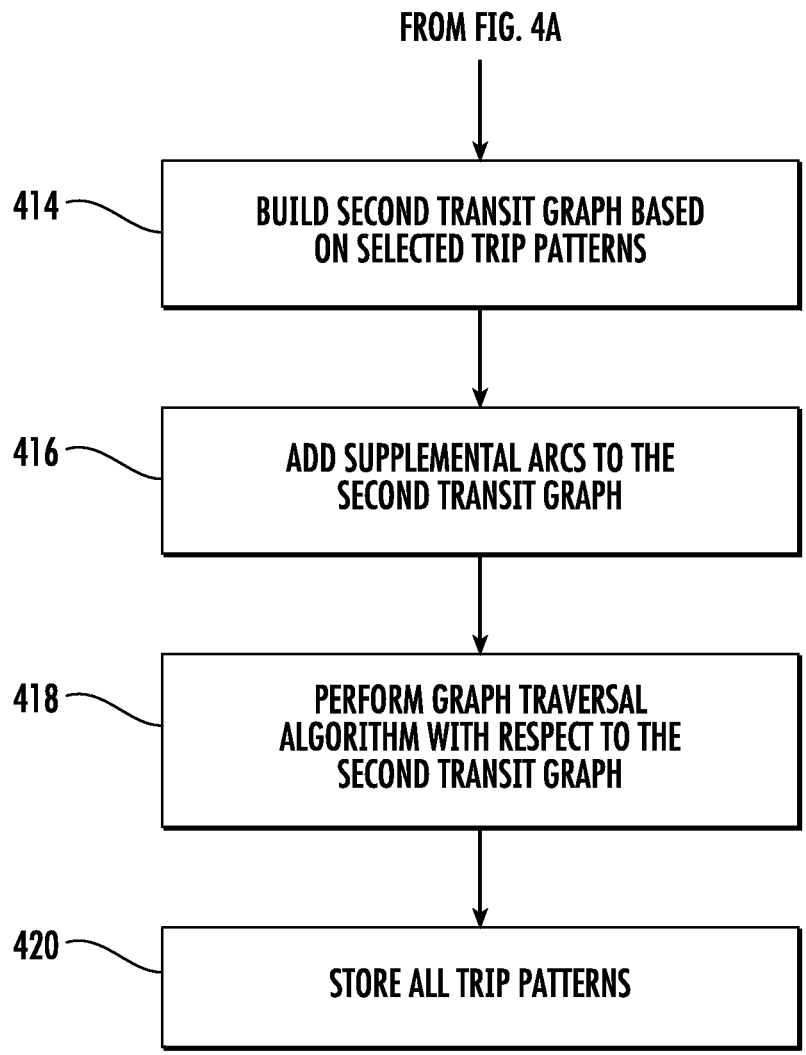

FIGS. 4A and 4B depict a flowchart of an exemplary method (400) for determining a plurality of trip patterns according to an exemplary embodiment of the present disclosure. While exemplary method (400) will be discussed with reference to the transit system 300 of FIG. 3, method (400) can be implemented to determine trip patterns with respect to any suitable transit system. Further, exemplary method (400) can be implemented using any suitable computing device or system including, for example, system 100 of FIG. 1 and system 500 of FIG. 5. In particular, trip pattern identification module 122 can be implemented to perform exemplary method (400).

Additionally, although FIGS. 4A and 4B depict steps performed in a particular order for purposes of illustration and discussion, methods of the present disclosure are not limited to such particular order or arrangement. One skilled in the art, using the disclosures provided herein, will appreciate that various steps of the method (400) can be omitted, rearranged, combined, and/or adapted in various ways without deviating from the scope of the present disclosure.

At (402) transit graph data is received. The transit graph data can include a plurality of nodes and a plurality of arcs respectively connecting the plurality of nodes. Each arc can correspond to an available instance of transportation using a transit line and each node of the transit graph can respectively correspond to arrival or departure of an instance of transportation at a transit station. In some implementations, walking arcs or driving arcs, such as arcs representing transportation by taxi cab or rental vehicle, can be included in the transit graph.

As an example, the plurality of arcs described by the transit graph data can respectively correspond to each instance of available transportation along one of the transit paths included in transit system 300 of FIG. 3. Therefore, the transit graph data can describe 25 arcs respectively corresponding to available instances of transportation using ferry line 312. Each of such arcs can respectively connect two nodes corresponding to the departure of such instance of transportation using ferry line 312 from Station 1 and the arrival of such instance of transportation using ferry line 312 at Station 2.

One of skill in the art, in light of the disclosures contained herein, will appreciate that a graph describing a transit system can be constructed in numerous ways. As an example, with respect to rail line 342, the transit graph data can describe 50 arcs respectively connecting 50 nodes corresponding to departure from Station 6 to 50 nodes corresponding to arrival at Station 2 and each of such arcs can traverse 4 nodes corresponding to arrival and departure from each of Stations 7 and 8.

Alternatively, the transit graph data can describe 50 arcs respectively connecting 50 nodes corresponding to departure from Station 6 to 50 nodes corresponding to arrival at Station 7, 50 arcs respectively connecting 50 nodes corresponding to departure from Station 7 to 50 nodes corresponding to arrival at Station 8, and 50 arcs respectively connecting 50 nodes corresponding to departure from Station 8 to 50 nodes corresponding to arrival at Station 9. Generally, the present disclosure, including method (400) can be satisfied using a wide range of graph designs, including those discussed above.

At (404) a cost model is defined. In particular, the cost model can provide an arc cost for each arc described by the transit graph data received at (402).

The cost model can incorporate a plurality of parameters reflective of various costs associated with the transportation respectively associated with each arc, including duration, fare, mode of transportation, transit provider (agency), vehicle type, or a penalty associated with undesirable factors such as a walking penalty. Thus, the arc cost for each arc can be the sum of its costs for each parameter.

As a simplified example, an exemplary cost model can include two parameters for each arc: duration of the transportation associated with such arc, and penalty of the transportation. The penalty for transportation can include walking penalties, fares, or other suitable penalties. The arc cost for the arc can be the sum of the two parameters. In particular, in order to sum the two parameters, the penalty parameter must be expressed in a homogenous fashion as the duration parameter. Therefore, the penalty parameter can be expressed in units of time. For example, a penalty of 5 minutes can be assigned to each arc corresponding to transportation using an undesirable vehicle type.

One of skill in the art, in light of the disclosures provided herein, will appreciate that many additional parameters can be added or modeled without departing from the scope of the present disclosure. As another example, a cost model can include a plurality of parameters respectively having one of a plurality of weighting factors.

As yet another example, a cost model can have a plurality of parameters expressed in non-homogenous units. As such, optimal paths through the transit graph can optimize across any one of such parameters. Thus, a shortest-path algorithm, such as Dijkstra's algorithm, can return several optimal paths which are not comparable unless relative adjustments are defined.

At (406) a first optimal transit trip is determined based on the cost model. For example, any suitable shortest-path algorithm can be used to determine the optimal transit trip from an origin to a destination, including Dijkstra's algorithm. In particular, such shortest-path algorithm can apply the cost model defined at (404) to the transit graph data received at (402). In such fashion, the optimal transit trip from the origin to the destination can be determined.

The determined optimal transit trip can include a plurality of solution arcs respectively connecting a pair of solution nodes. As an example, an exemplary shortest-path algorithm might determine that a particular transit trip along third route 330 of FIG. 3 is the optimal transit trip from Origin A to the Destination B based on the cost model defined at (404).

In such instance, the determined optimal transit trip can include: a first solution arc corresponding to an instance of transportation using bus line 332; a second solution arc corresponding to an instance of transportation using tram line 334; and a third solution arc corresponding to an instance of transportation using tram line 336.

Further, the first solution arc can connect a first pair of solution nodes (corresponding to departure from Station 1 and arrival at Station 4), the second solution arc can connect a second pair of solution nodes (corresponding to departure form Station 4 and arrival at Station 5), and the third solution arc can connect a third pair of solution nodes (corresponding to departure from Station 5 and arrival at Station 2).

As another example, an exemplary shortest-path algorithm might determine that a particular transit trip along fourth route 340 is the optimal transit trip from Origin A to Destination B. Therefore, a first solution arc can correspond to an instance of transportation from Station 6 to Station 2 using rail line 342.

As discussed above, depending on selected graph design, the first solution arc can correspond to a single arc connecting nodes corresponding to Station 6 and Station 2 while traversing Stations 7 and 8, or the first solution arc can correspond to three arcs respectively connecting nodes corresponding to Stations 6 and 7, Stations 7 and 8, and Stations 8 and 2. In the latter instance, such three arcs can be collectively treated as a single solution arc for the purposes of method (400).

Returning to FIG. 4, at (408) the trip pattern exhibited by the optimal transit trip determined at (406) is identified or extracted. In particular, the trip pattern can describe a sequence of transit stations at which a passenger travelling upon the optimal transit trip determined at (406) would be required to board or disembark a vehicle providing transportation. Such identified trip pattern can be stored for later processing.

As an example, if an exemplary shortest-path algorithm determined at (406) that a particular transit trip along third route 330 was the optimal transit trip, then the trip pattern exhibited by such transit trip can be identified at (408). More particularly, in such exemplary instance, the trip pattern identified at (408) can be identified as 1>4>4>5>5>2.

One of skill in the art, in light of the disclosures provided herein, will appreciate that the trip pattern identified at (408) can be written in a number of formats which all represent the same core information. For example, the trip pattern 1>4>4>5>5>2 can be written as [1,4], [4,5], [5,2] in order to more precisely identify the pairs of solution nodes. Many other notations are available as well. It will be appreciated that such notations are simply a matter of convention and each of such notations can be used in accordance with the present disclosure.

At (410) the cost model can be revised based on the optimal transit trip determined at (406). In particular, the cost model can be revised such that the arc costs associated with one or more arcs associated with the optimal transit trip can be increased.

As an example, revising the cost model based on the determined optimal transit trip can include increasing the arc cost associated with each arc connecting nodes corresponding to the same pair of stations as one of the pairs of solution nodes traversed by the optimal transit trip determined at (406). For example, if the optimal transit trip determined at (406) corresponds to an instance of travel upon third route 330, then revising the cost model at (410) can include penalizing all arcs included in the transit graph data received at (402) that connect nodes corresponding to Station 1 and Station 4, penalizing all arcs that connect nodes corresponding to Station 4 and Station 5, and penalizing all arcs that connect nodes corresponding to Station 5 and Station 2.

As another example, revising the cost model at (410) can include increasing the arc cost associated with each arc connecting nodes corresponding to the same pair of stations as the pair of solution nodes connected by the solution arc having the arc cost of greatest magnitude. For example, if the optimal transit trip determined at (406) corresponds to a particular instance of travel upon third route 330 and the solution arc corresponding to the portion of tram line 336 connecting Stations 5 and 2 has the arc cost of greatest magnitude, then only those arcs that connect nodes corresponding to Stations 5 and 2 can be penalized at (410).

As another example, revising the cost model based on the determined optimal transit trip can include increasing the arc cost associated with each arc corresponding to one or more of the transit lines utilized by the optimal transit trip determined at (406). For example, if the optimal transit trip determined at (406) corresponds to an instance of travel upon third route 330, then revising the cost model at (410) can include penalizing all arcs included in the transit graph data that correspond to a portion of bus line 332, penalizing all arcs that correspond to a portion of tram line 334, and/or penalizing all arcs that correspond to a portion of tram line 336.

As yet another example, revising the cost model based on the determined optimal transit trip can include increasing the arc cost associated with each arc corresponding to one or more vehicle types utilized by the optimal transit trip determined at (406). For example, if the optimal transit trip determined at (406) corresponds to an instance of travel upon fourth route 440, then revising the cost model at (410) can include penalizing all arcs that correspond to transportation by rail (due to utilization of rail line 342). Therefore, with respect to the example provided in FIG. 3, all arcs corresponding rail lines 342 and 322 can be penalized (but not, for example, tram lines 324, 334, or 336, ferry line 312, or bus line 332).

As another example, revising the cost model based on the determined optimal transit trip can include increasing the arc cost associated with each arc corresponding to one or more vehicle providers or agencies providing transportation utilized by the optimal transit trip determined at (406). For example, if the optimal transit trip determined at (406) corresponds to an instance of travel upon first route 310 and ferry line 312 is operated by Western State Ferry Authority, then revising the cost model at (410) can include penalizing all arcs included in the transit graph data received at (402) that correspond to transportation by a ferry operated by Western State Ferry Authority, whether or not such transportation corresponds to the particular ferry line 312.

According to an aspect of the present disclosure, each of the plurality of arcs described by the transit graph data can have an associated duration. In particular, the duration associated with each arc can describe an amount of time that the transportation represented by such arc is expected or projected to take. For example, as shown in FIG. 3, transportation from Station 1 to Station 2 using ferry line 312 is expected to have a duration of 45 minutes. Such duration can be associated with each arc corresponding to such portion of ferry line 312. It will be appreciated, however, that arcs corresponding to the same portion of a transit line may in fact have different durations, such that traffic patterns or other factors can be accommodated or modeled.

The duration of solution arcs can be considered when revising the cost model at (410). In particular, according to an aspect of the present disclosure, the penalty applied to each arc that is penalized at (410) can be proportional to the duration associated with such arc. For example, if the optimal transit trip determined at (406) corresponds to a particular instance of travel upon third route 330, then one or more arcs corresponding to one or more of transit paths 332, 334, or 336 can be penalized. However, the particular penalty applied to each arc can be proportional to the duration associated with such arc. Therefore, non-identical penalties can be applied at (410).

In particular, in one implementation, the penalties applied to arcs corresponding to transit path 336 can be 1.5 times the magnitude of the penalties applied to arcs corresponding to transit paths 332 and 334. However, a one-to-one proportionality between penalty magnitude and duration is not required. Further, proportionality is not a strictly required facet of the present disclosure and, in fact, penalization of arcs at (410) can simply include addition of a positive constant to the arc cost associated with each arc subject to penalization.

As another example, revising the cost model at (410) can include increasing the arc cost associated with each arc connecting nodes corresponding to the same stations as the pair of solution nodes connected by the solution arc having the duration of greatest magnitude. For example, if the optimal transit trip determined at (406) corresponds to a particular instance of travel upon third route 330, then only those arcs that connect nodes corresponding to Stations 5 and 2 can be penalized at (410) because the 15 minute duration associated with the portion of tram line 336 connecting Stations 5 and 2 is greater than the duration associated with any other segment of transit route 330.

One of skill in the art, in light of the disclosures contained herein, will appreciate that the above disclosed exemplary criteria for revising the cost model at (410) are non-exhaustive in nature. In particular, multiple criteria can be applied simultaneously or sequentially to satisfy (410). Further, criteria can be combined with or modified by one another to create new criteria.

At (412) it is determined whether additional iterations of (406)-(410) are desired. If it is determined at (412) that additional iterations are desired, then method (400) returns to (406) and determines a second optimal transit trip based on the cost model as previously revised at (410). In particular, because one or more arcs associated with the first optimal transit trip determined at (406) were penalized or otherwise had their arc costs increased at (410), then a subsequent iteration of (406)-(410) is likely to determine a different, second optimal transit trip based on the revised cost model.

Therefore, performing a plurality of iterations of (406)-(410) can serve to determine a plurality of unique optimal transit trips and, likewise, identify a plurality of unique trip patterns. Thus, performing a plurality of such iterations is desirable and can serve to satisfy the need for the plurality of trip patterns. Further, it will be appreciated that different methods of revising the cost model can be performed at different iterations of (410) such that unique trip patterns are continuously identified.

The decision at (412) can be made based upon a number of factors. In one implementation, the number of iterations performed is compared to a target number. For example, method (400) can be implemented to perform exactly 100 iterations of (406)-(410) and then proceed to (414) of FIG. 4B following the one-hundredth iteration.

In another implementation, a clever stop to iterations can be performed at (412). For example, it can be determined at (412) that additional iterations are not desired when the optimal transit trip determined by the previous iteration fails to meet certain criteria. As an example, if the optimal transit trip determined by the previous iteration is greater than a threshold duration, then it can be determined at (412) that additional iterations are not desired and method (400) can proceed to (414).

In one implementation, the threshold duration is determined based upon the first optimal trip determined at the first iteration of (406). For example, if at (412) it is determined that the duration of the most recently determined optimal transit trip is greater than two times the duration of the first optimal trip determined at the first iteration, then it can be determined that additional iterations are not desired.

As discussed above, performing a plurality of iterations of (406)-(410) can serve to determine a plurality of unique optimal transit trips and, likewise, identify a plurality of unique trip patterns. However, in some implementations, performing a plurality of identification iterations will fail to identify every available transit trip and, therefore, fail to identify every available trip pattern.

As an example, performing a plurality of iterations of (406)-(410) can fail to identify every available transit trip in the following scenario: assume an Origin A and a Destination B. Such exemplary transit network can further include a transit path from Origin A to a Station 1; a transit path from Origin A to Station 2; a transit path from Station 1 to Destination B; a transit path from Station 2 to Destination B; and a transit path connecting Stations 1 and 2.

A first iteration of (406) can consider a cost model to determine a first optimal transit trip. For example, the first optimal transit trip can have the following trip pattern: A>1>1>B.

The cost model can be revised based on such first optimal transit trip at (410). For example, the arcs respectively corresponding to the transit paths connecting Origin A to Station 1 and connecting Station 1 to Destination B can be penalized.

A second iteration of (406) can consider the revised cost model to determine a second optimal transit trip. For example, the second optimal transit trip can have the following trip pattern: A>2>2>B.

The cost model can be revised based on such second optimal transit trip at (410). For example, the arcs respectively corresponding to the transit paths connecting Origin A to Station 2 and connecting Station 2 to Destination B can be penalized and method (400) can again return to (406).

However, one of skill in the art will appreciate that iteratively performing the above exemplary steps will never discover transit trips that utilize the transit path connecting Stations 1 and 2. More particularly, when all arcs corresponding to the each entire optimal transit trip are penalized and several independent trips are available, then the iterative method will tend to repetitively select such trips as the optimal transit trips.

Therefore, additional steps can be performed in order to identify additional unique trip patterns. In particular, the plurality of trip patterns identified by the plurality of iterations of (406)-(410) can be merged to identify such additional trip patterns.

Referring now to FIG. 4B, at (414) a second transit graph can be built based on selected of the plurality of trip patterns identified at previous iterations of (408). For example a directed graph can be built describing a plurality of arcs which connect stations corresponding to pairs of solution nodes according to the previously identified trip patterns. As another example, the second transit graph can have a second origin node and a second destination node which respectively correspond to the origin node and the destination node of the first transit graph received at (402). Alternatively, the second transit graph constructed at (414) can be based on solution arcs included in selected of the plurality of optimal transit trips identified at previous iterations of (406).

At (416) one or more supplemental arcs can be added to the second transit graph constructed at (414). As an example, the supplemental arcs can be arcs that were not traversed by any of the previously determined optimal transit trips. For example, the supplemental arcs can correspond to walking arcs between stations. As another example, the supplemental arcs can correspond to arcs that provide a connection between more substantial "main" transit routes.

At (418) one or more graph traversal algorithms can be performed with respect to the second transit graph data. In one implementation, all possible routes between a second origin node and a second destination node included in the second transit graph can be identified at (418). The trip pattern associated with each of such routes can be identified and stored.

Exemplary graph traversal algorithms include, but are not limited to, a depth-first search algorithm, a breadth-first search algorithm, or other suitable algorithms. The trip patterns associated with all traversal routes can be identified and stored.

At (420) all identified trip patterns can be stored for further processing. For example, the trip patterns stored at (420) can be those identified at the plurality of iterations of (408). The trip patterns stored at (420) can also be those identified by performing the graph traversal algorithm with respect to the second transit graph data at (418).

Figure 5:
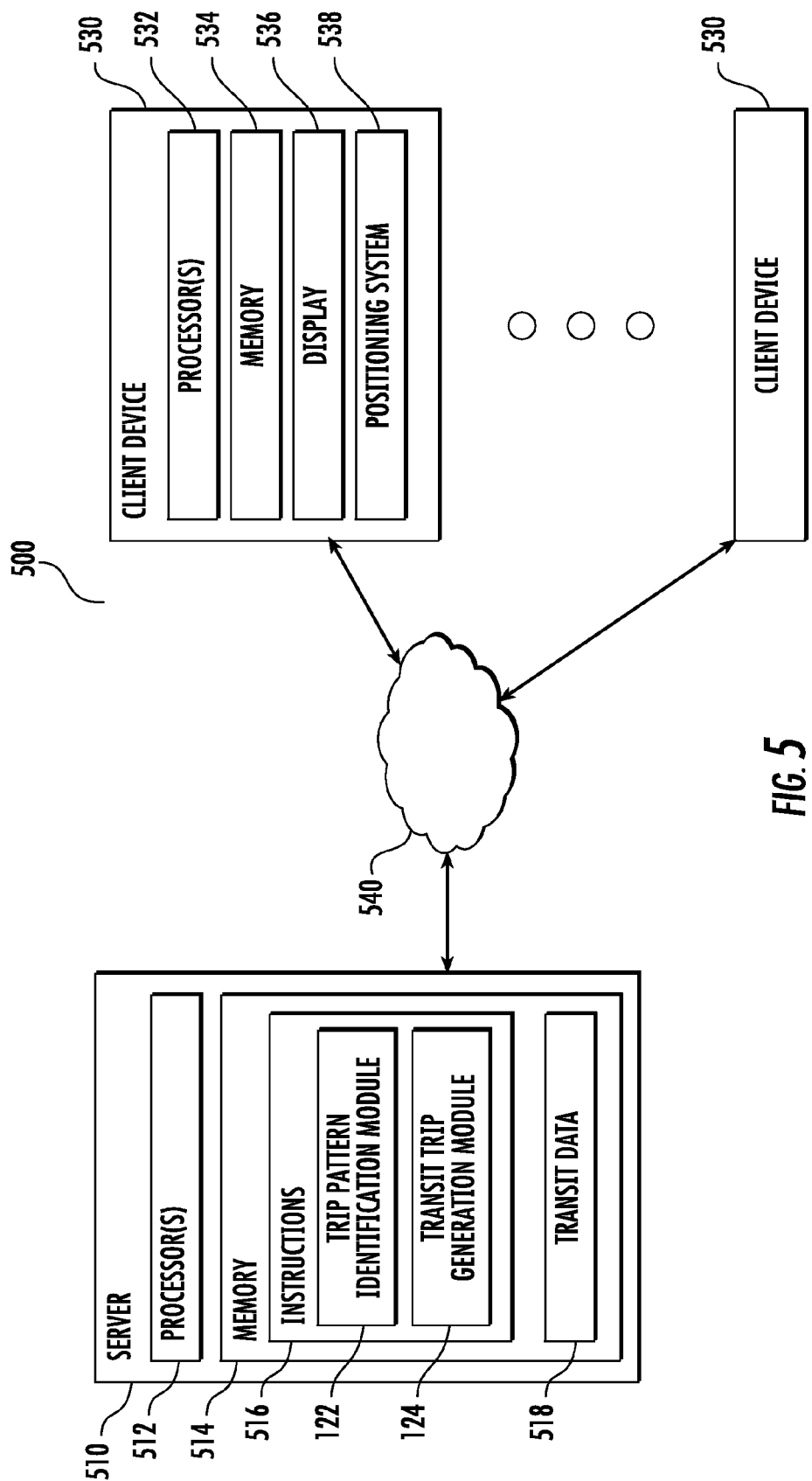
FIG. 5 depicts an exemplary computing system according to an exemplary embodiment of the present disclosure.

FIG. 5 depicts an exemplary computing system 500 that can be used to implement the methods and systems for transit trip planning according to aspects of the present disclosure. The system 500 has a client-server architecture that includes a server 510 that communicates with one or more client devices 530 over a network 540. The system 500 can be implemented using other suitable architectures, such as a single computing device.

The system 500 includes a server 510, such as a web server. The server can host a transit planning platform. The server 510 can be implemented using any suitable computing device(s). The server 510 can have a processor(s) 512 and a memory 514. The server 510 can also include a network interface used to communicate with one or more remote computing devices (e.g. client devices) 530 over the network 540.

The processor(s) 512 can be any suitable processing device, such as a microprocessor, microcontroller, integrated circuit, or other suitable processing device. The memory 514 can include any suitable computer-readable medium or media, including, but not limited to, non-transitory computer-readable media, RAM, ROM, hard drives, flash drives, or other memory devices. The memory 514 can store information accessible by processor(s) 512, including instructions 516 that can be executed by processor(s) 512. The instructions 516 can be any set of instructions that when executed by the processor(s) 512, cause the processor(s) 512 to provide desired functionality. For instance, the instructions 516 can be executed by the processor(s) 512 to implement the trip pattern identification module 122, and the transit trip generation module 124.

It will be appreciated that the term "module" refers to computer logic utilized to provide desired functionality. Thus, a module can be implemented in hardware, application specific circuits, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM, ROM, hard disk or optical or magnetic media.

Memory 514 can also include data 518, such as transit data, that can be retrieved, manipulated, created, or stored by processor(s) 512. The data 518 can be stored in one or more databases. The one or more databases can be connected to the server 510 by a high bandwidth LAN or WAN, or can also be connected to server 510 through network 540. The one or more databases can be split up so that they are located in multiple locales.

The server 510 can exchange data with one or more client devices 530 over the network 540. Although two clients 530 are illustrated in FIG. 5, any number of client devices 530 can be connected to the server 510 over the network 540. The client devices 530 can be any suitable type of computing device, such as a general purpose computer, special purpose computer, laptop, desktop, integrated circuit, mobile device, smartphone, tablet, wearable computing device, or other suitable computing device.

Similar the computing device 510, a client device 530 can include a processor(s) 532 and a memory 534. The memory 534 can store information accessible by processor(s) 532, including instructions that can be executed by processor(s) 532 and data. The client device 530 can include various input/output devices for providing and receiving information from a user, such as a touch screen, touch pad, data entry keys, speakers, and/or a microphone suitable for voice recognition. For instance, the computing device 530 can have a display 536 for presenting information, such as recommended transit trips to a user.

The client device 530 can also include a positioning system 538 that can be used to identify the position of the client device 530. The positioning system 538 can be optionally used by the user to monitor the user's position relative to a transit route. The positioning system 538 can be any device or circuitry for monitoring the position of the client device 530. For example, the positioning device 538 can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or WiFi hotspots, and/or other suitable techniques for determining position.

In situations in which the systems and method discussed herein collect information about users, such as position data, user preferences, or other information, the users may be provided with an opportunity to control whether programs or features collect the information and control whether and/or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how information is collected about the user and used by the application or system. In addition, certain information or data can be treated in or more ways before it is stored or used, so that personally identifiable information is removed.

The network 540 can be any type of communications network, such as a local area network (e.g. intranet), wide area network (e.g. Internet), or some combination thereof. The network 540 can also include a direct connection between a client device 530 and the server 510. In general, communication between the server 510 and a client device 530 can be carried via network interface using any type of wired and/or wireless connection, using a variety of communication protocols (e.g. TCP/IP, HTTP), encodings or formats (e.g. HTML, XML), and/or protection schemes (e.g. VPN, secure HTTP, SSL).

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of determining a plurality of trip patterns, the method comprising
   receiving, by one or more computing devices, transit graph data describing a plurality of nodes respectively corresponding to a plurality of transit stations and a plurality of arcs respectively connecting the plurality of nodes and respectively corresponding to transportation between the plurality of transit stations;
   performing, by one or more computing devices, a plurality of identification iterations, each identification iteration comprising:
      determining an optimal transit trip connecting an origin node to a destination node based on a cost model providing an arc cost for each of the plurality of arcs; and
      revising the cost model based on the determined optimal transit trip, such that the arc costs associated with one or more arcs associated with the optimal transit trip are increased;
   wherein each subsequent identification iteration determines the optimal transit trip based on the cost model as revised by the immediately preceding identification iteration such that a plurality of optimal transit trips are determined, each optimal transit trip having an associated trip pattern describing a sequence of nodes traversed by such optimal transit trip and wherein the trip pattern associated with each optimal transit trip comprises a sequence of one or more pairs of solution nodes;
   revising, by one or more computing devices, the cost model based on the determined optimal transit trip, wherein revising the cost model comprises increasing the arc cost associated with each arc connecting, nodes corresponding to the same stations as one of the pairs of solution nodes; and
   displaying to a user, by the one or more computing devices, one or more of the determined optimal transit trips.

2. The computer-implemented method of claim 1, wherein the arc cost associated with each arc connecting nodes corresponding to the same stations as one of the pairs of solution nodes is increased by an amount that is proportional to a duration associated with such arc.

3. The computer-implemented method of claim 1, wherein:
   the optimal transit trip determined at each iteration comprises a plurality of solution arcs respectively connecting a plurality of pairs of solution nodes; and
   revising the cost model based on the determined optimal transit trip comprises increasing the arc cost associated with each arc connecting nodes corresponding to the same stations as the pair of solution nodes connected by the solution arc having the arc cost of greatest magnitude.

4. The computer-implemented method of claim 1, wherein:
the optimal transit trip determined at each iteration comprises a plurality of solution arcs, each solution arc having a duration and connecting a pair of solution nodes; and
revising the cost model based on the determined optimal transit trip comprises increasing the arc cost associated with each arc connecting nodes corresponding to the same stations as the pair of solution nodes connected by the solution arc having the duration of greatest magnitude.

5. The computer-implemented method of claim 1, wherein:
the optimal transit trip determined at each iteration comprises a plurality of solution arcs, each solution arc corresponding to a portion of one of a plurality of a transit lines; and
revising the cost model based on the determined optimal transit trip comprises identifying at least one transit line associated with at least one solution arc and increasing the arc cost associated with each arc corresponding to the identified at least one transit line.

6. The computer-implemented method of claim 1, wherein:
the optimal transit trip determined at each iteration comprises a plurality of solution arcs, each solution arc corresponding to transportation provided by one of a plurality of transit providers; and
revising the cost model based on the determined optimal transit trip comprises identifying at least one transit provider associated with at least one solution arc and increasing the arc cost associated with each arc corresponding to the identified transit provider.

7. The computer-implemented method of claim 1, wherein:
the optimal transit trip determined at each iteration comprises a plurality of solution arcs, each solution arc corresponding to one of a plurality of modes of transportation; and
revising the cost model based on the determined optimal transit trip comprises identifying at least one mode of transportation associated with at least one solution arc and increasing the arc cost associated with each arc corresponding to the identified mode of transportation.

8. The computer-implemented method of claim 1, wherein performing a plurality of identification iterations further comprises ceasing to perform identification iterations when the optimal transit trip determined by the previous identification iteration has a duration greater than a threshold duration, the threshold duration having been determined based on the first optimal transit trip determined at the first identification iteration.

9. The computer-implemented method of claim 1, further comprising:
forming a second transit graph based on selected of the plurality of trip patterns; and
performing at least one graph traversal algorithm with respect to the second transit graph.

10. The computer-implemented method of claim 9, further comprising adding one or more supplemental arcs to the second transit graph prior to performing the at least one graph traversal algorithm, the one or more supplemental arcs corresponding to walking routes between transit stations.

11. A non-transitory computer-readable medium storing instructions that when executed by one or more processors cause the one or more processors to perform operations comprising:

receiving transit graph data describing a plurality of arcs that correspond to transportation between transit stations, the plurality of arcs respectively interconnecting a plurality of nodes that respectively correspond to departure or arrival of the transportation at the transit stations;
defining a cost model such that a plurality of arc costs are respectively associated with the plurality of arcs;
determining a first shortest path between an origin node and a destination node based on the cost model, the first shortest path including one or more first solution arcs respectively connecting one or more pairs of first solution nodes;
revising the cost model to increase the arc cost associated with each arc connecting nodes corresponding to the same stations as one of the pairs of first solution nodes;
determining a second shortest path between the origin node and the destination node based on the revised cost model; and
displaying to a user at least one of the first shortest path and the second shortest path.

12. The computer-readable medium of claim 11, wherein revising the cost model to increase the arc cost associated with each arc connecting nodes corresponding to the same stations as one of the pairs of first solution nodes comprises increasing the arc cost associated with each arc connecting nodes corresponding to the same stations as one of the pairs of first solution nodes by an amount that is proportional to a duration associated with such arc.

13. The computer-readable medium of claim 11, storing further instructions for performing operations comprising, prior to determining the second shortest path:
identifying one or more transit lines respectively associated with the one or more first solution arcs; and
revising the cost model to increase the arc cost associated with each arc corresponding to the one or more transit lines.

14. The computer-readable medium of claim 11, storing further instructions for performing operations comprising:
determining a first trip pattern based on the first shortest path, the first trip pattern comprising a first sequence in which the first shortest path traverses the first pairs of solution nodes; and
determining a second trip pattern based on the second shortest path, the second trip pattern comprising a second sequence in which the second shortest path traverses one or more pairs of second solution nodes.

15. The computer-readable medium of claim 11, wherein:
the second shortest path includes one or more second solution arcs respectively connecting one or more pairs of second solution nodes; and
the computer-readable medium stores further instructions for performing operations comprising, after determining the second shortest path, building a directed graph comprising the one or more first solution arcs and the one or more second solution arcs.

16. A computing system comprising a memory and a processor, the computing system being configured to identify a plurality of trip patterns by performing operations comprising:
storing first transit graph data describing a first plurality of nodes interconnected by a first plurality of arcs;
performing a plurality of iterations to respectively determine a plurality of shortest paths between an origin and a destination according to a cost model respectively providing a plurality of arc costs for the first plurality of arcs;

wherein the cost model is revised following each iteration to increase one or more arc costs respectively associated with one or more arcs traversed by the shortest path determined in the previous iteration and wherein each iteration determines the shortest path based on the cost model as revised by the immediately preceding iteration such that a plurality of shortest paths are determined, each shortest path having an associated trip pattern describing a sequence of nodes traversed by such shortest path and wherein the trip pattern associated with each shortest path comprises a sequence of one or more pairs of solution nodes;

revising the cost model based on the determined shortest path, wherein revising the cost model comprises increasing the arc cost associated with each arc connecting nodes corresponding to the same nodes as one of the pairs of solution nodes; and displaying to a user one or more of the determined shortest paths.

17. The computing system of claim 16, being configured to perform further operations comprising:

generating, based on the plurality of shortest paths, second transit graph data comprising a second plurality of nodes interconnected by a second plurality of arcs;

performing at least one graph traversal algorithm with respect to the second transit graph data; and identifying the plurality of trip patterns based on the plurality of shortest paths and the performance of the at least one graph traversal algorithm.

18. The computing system of claim 17, wherein performing at least one graph traversal algorithm with respect to the second transit graph data comprises identifying all possible paths between a second origin and a second destination of the second transit graph data.

19. The computing system of claim 16, being configured to perform further operations comprising:

identifying a first plurality of trip patterns based on the plurality of shortest paths; and identifying a second plurality of trip patterns by merging selected of the first plurality of trip patterns.

\* \* \* \* \*